United States Patent
Tasker (10) Patent No.: US 11,156,394 B2
(45) Date of Patent: Oct. 26, 2021

(54) SYSTEMS AND METHODS FOR PRESSURE CONTROL IN A HEATING, VENTILATION, AND AIR CONDITIONING (HVAC) SYSTEM

(71) Applicant: Johnson Controls Technology Company, Auburn Hills, MI (US)

(72) Inventor: Tom R. Tasker, Andover, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 167 days.

(21) Appl. No.: 15/926,053

(22) Filed: Mar. 20, 2018

(65) Prior Publication Data
US 2019/0264968 A1 Aug. 29, 2019

Related U.S. Application Data

(60) Provisional application No. 62/635,773, filed on Feb. 27, 2018.

(51) Int. Cl.
*F25B 13/00* (2006.01)
*F25B 49/02* (2006.01)
*F25D 17/06* (2006.01)

(52) U.S. Cl.
CPC ............ *F25B 49/022* (2013.01); *F25B 13/00* (2013.01); *F25D 17/06* (2013.01); *F25B 2700/193* (2013.01)

(58) Field of Classification Search
CPC .. F25B 49/022; F25B 2700/193; F25B 17/06; F25B 13/00
See application file for complete search history.

(56) References Cited

U.S. PATENT DOCUMENTS 5,289,692 A * 3/1994 Campbell ............ B60H 1/3225
62/181
6,092,378 A 7/2000 Das et al.
(Continued)

FOREIGN PATENT DOCUMENTS

| JP | 2013257132 A | 12/2013 |
| WO | 2012177720 A1 | 12/2012 |
| WO | 2016138382 A1 | 9/2016 |

OTHER PUBLICATIONS

Trane, Product Data Convertible Air Handlers, Aug. 2017, Full Document (Year: 2017).*

*Primary Examiner* — Elizabeth J Martin
*Assistant Examiner* — Nael N Babaa
(74) *Attorney, Agent, or Firm* — Fletcher Yoder, P.C.

(57) ABSTRACT

The present disclosure relates to a heating, ventilation, and air conditioning (HVAC) unit having a vapor compression circuit including a compressor and a heat exchanger. The HVAC unit includes a controller configured to provide a first signal to control the compressor, and provide a second signal to control a variable speed fan associated with the heat exchanger based on a target speed. The HVAC unit further includes a pressure activated device coupled between the controller and the compressor, wherein the pressure activated device is configured to temporarily block the first signal from the controller while a refrigerant pressure within the vapor compression circuit is greater than a threshold value. In response to determining that the pressure activated device has blocked the first signal for at least a threshold time period, the controller is configured to both deactivate the first signal and provide the second signal for an equilibration time.

18 Claims, 7 Drawing Sheets

(56) References Cited

U.S. PATENT DOCUMENTS

| | | | |
|---|---|---|---|
| 6,141,978 A | 11/2000 | Schuster | |
| 6,907,745 B2 | 6/2005 | Turner et al. | |
| 8,948,918 B2 | 2/2015 | Chamorro et al. | |
| 9,638,434 B2 | 5/2017 | Alston | |
| 2004/0129015 A1* | 7/2004 | Apparao | F25B 7/00 |
| | | | 62/335 |
| 2006/0127224 A1* | 6/2006 | Sweet | F04B 49/065 |
| | | | 417/32 |
| 2006/0236708 A1* | 10/2006 | Mizuno | B60H 1/3219 |
| | | | 62/228.3 |
| 2010/0298982 A1* | 11/2010 | Chamorro | F24F 11/62 |
| | | | 700/276 |
| 2015/0184924 A1* | 7/2015 | Vie | F25D 21/004 |
| | | | 62/80 |
| 2017/0030621 A1* | 2/2017 | Hung | F25B 49/02 |
| 2017/0244312 A1* | 8/2017 | Normann | E21B 43/121 |

\* cited by examiner

SYSTEMS AND METHODS FOR PRESSURE CONTROL IN A HEATING, VENTILATION, AND AIR CONDITIONING (HVAC) SYSTEM

CROSS REFERENCE TO RELATED APPLICATIONS

This application claims priority from and the benefit of U.S. Provisional Application Ser. No. 62/635,773, entitled "SYSTEMS AND METHODS FOR PRESSURE CONTROL IN A HEATING, VENTILATION, AND AIR CONDITIONING (HVAC) SYSTEM," filed Feb. 27, 2018, which is hereby incorporated by reference in its entirety for all purposes.

BACKGROUND

This disclosure relates generally to heating, ventilation, and air conditioning (HVAC) systems. Specifically, the present disclosure relates to a pressure control system for HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A heating, ventilation, and air conditioning (HVAC) system may be used to thermally regulate an environment, such as a building, home, or other structure. The HVAC system generally includes a vapor compression system having an outdoor heat exchanger and an indoor heat exchanger, which cooperate to transfer thermal energy between the interior of the structure and the external environment. A compressor generally circulates a refrigerant through conduits extending between the indoor and outdoor heat exchangers. In certain cases, thermal energy can accumulate within portions of the vapor compression system, which may increase a refrigerant pressure within the heat exchangers and/or the conduits. Increased refrigerant pressure can reduce an operational efficiency of the HVAC system and, in some cases, induce wear on certain components, such as the compressor, the heat exchangers, and/or the conduits of the vapor compression system.

SUMMARY

The present disclosure relates to a heating, ventilation, and air conditioning (HVAC) unit having a vapor compression circuit including a compressor and a heat exchanger. The HVAC unit includes a controller configured to provide a first signal to control the compressor, and provide a second signal to control a variable speed fan associated with the heat exchanger based on a target speed. The HVAC unit further includes a pressure activated device coupled between the controller and the compressor, wherein the pressure activated device is configured to temporarily block the first signal from the controller while a refrigerant pressure within the vapor compression circuit is greater than a threshold value. In response to determining that the pressure activated device has blocked the first signal for at least a threshold time period, the controller is configured to both deactivate the first signal and provide the second signal for an equilibration time.

The present disclosure also relates to a heating, ventilation, and air conditioning (HVAC) system that includes: a controller; a vapor compression circuit having a compressor configured to be controlled by the controller; a variable speed outdoor fan associated with an outdoor heat exchanger of the vapor compression circuit; and a pressure activated device electrically coupled between the controller and the compressor. The pressure activated device is configured to transition between an engaged configuration and a disengaged configuration when a refrigerant pressure in the vapor compression circuit exceeds a threshold pressure, and configured to manage control signals from the controller to the compressor based on being in the engaged configuration or the disengaged configuration. In response to determining that the pressure activated device has been disposed in the disengaged configuration for at least a threshold time period, the controller is configured to deactivate at least an aspect of control of the compressor and operate the variable speed outdoor fan based on a target speed for an equilibration time.

The present disclosure also relates to a controller for a heating, ventilation, and air conditioning (HVAC) unit including a tangible medium storing instructions executable by a processor. The instructions include instructions to receive a call for compressor operation and, in response, provide a first signal via an electrical pathway between the controller and the compressor to operate a compressor of the HVAC unit. The instructions also include instructions to determine that a pressure activated device of the HVAC unit has interrupted the electrical pathway for at least a threshold time period, and in response, deactivating the first signal and activating a second signal that operates a variable speed outdoor fan of the HVAC unit based on a first target speed for an equilibration time. The instructions further include instructions to, when the call for compressor operation is active at a conclusion of the equilibration time, again provide the first signal via the electrical pathway to operate the compressor while providing a third signal to operate the variable speed outdoor fan based on a second target speed.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned, a vapor compression system may include an outdoor heat exchanger and an indoor heat exchanger, which are fluidly coupled to one another via suitable conduits. The indoor heat exchanger may serve as the evaporator and the outdoor heat exchanger may serve as the condenser of the vapor compression system, depending on the direction of the refrigerant flow. A compressor circulates the refrigerant through the conduits, the heat exchangers, and an expansion device to enable the transfer of thermal energy between the outdoor and indoor heat exchangers. An indoor fan is associated with the indoor heat exchanger to direct an air flow from the interior of the building across the heat exchanger, which provides heat to, or removes heat from, the air flow before it is returned to the interior of the building. Additionally, a variable speed outdoor fan is associated with the outdoor heat exchanger to blow outside air across the heat exchanger, which provides heat to, or removes heat from, the outdoor air.

In some cases, excess thermal energy may accumulate throughout certain portions of the vapor compression system during operation of the HVAC system, and thus, enable a pressure of the refrigerant to deviate from a desired target pressure. As such, conventional vapor compression systems can include a pressure switch that is fluidly coupled to a conduit of the system and configured to disable the compressor and the outdoor fan when a pressure of the refrigerant within the conduit is beyond a predetermined acceptable pressure range. For example, such a pressure switch can move from an engaged configuration, or an engaged position, to a disengaged configuration, or a disengaged position when a pressure of the refrigerant exceeds a predetermined threshold pressure, which electrically decouples both the compressor and the outdoor fan from an electrical power supply. After a cooling period (also referred to herein as an equilibration time), when the pressure of the refrigerant again falls below the predetermine threshold pressure, the pressure switch may return to the engaged position, which electrically couples both the compressor and the variable speed outdoor fan to resume operation.

However, while the compressor and the outdoor fan have traditionally been activated and deactivated in tandem (e.g., via a single signal or set of contacts), it is presently recognized that thermal dissipation from the vapor compression system is substantially slower while the outdoor fan is disabled. As such, it is recognized that it is desirable to separately activate and regulate a variable speed outdoor fan while the compressor is deactivated during the equilibration time, reducing a length of the equilibration time and maximizing normal operation of the vapor compression system. In addition, conventional vapor compression systems typically reactivate the compressor and the variable speed outdoor fan simultaneously, including at the end of the equilibration time. As such, it is recognized that this simultaneous reactivation can result in a substantially large power draw that reduces the efficiency of HVAC system, and may also increase wear or cause damage to certain components of the HVAC system.

With the foregoing in mind, embodiments of the present disclosure are directed to a pressure control system designed and configured to enable controlled operation of the variable speed outdoor fan while the compressor is deactivated by a pressure activated device, such as the pressure switch, due to a high pressure condition within the vapor compression system. As such, the disclosed pressure control system generally enhances a rate at which thermal energy is dissipated from the vapor compression system to more quickly and effectively reduce the pressure of the refrigerant to within a normal operational range. In particular, the pressure control system includes a controller configured to increase a speed of the variable speed outdoor fan while the compressor is disabled, such that the increased speed of the variable speed outdoor fan enhances airflow across the outdoor heat exchanger during the equilibration time. Accordingly, a length of the equilibration time of the vapor compression system may be reduced and, as such, the HVAC system may resume normal operation with less intermission, compared to a conventional vapor compression system using a typical electrical configuration. In addition, at the end of the equilibration time, the disclosed controller is capable of reactivating the compressor while the variable speed outdoor fan is already running. It is recognized that this staggered reactivation reduces the total power draw by the vapor compression system during restart, improving the efficiency of the HVAC system and limiting or reducing wear of certain components of the HVAC system, such as power transmission and conversion components of the vapor compression system (e.g., transmission lines and transformers).

Figure 1:
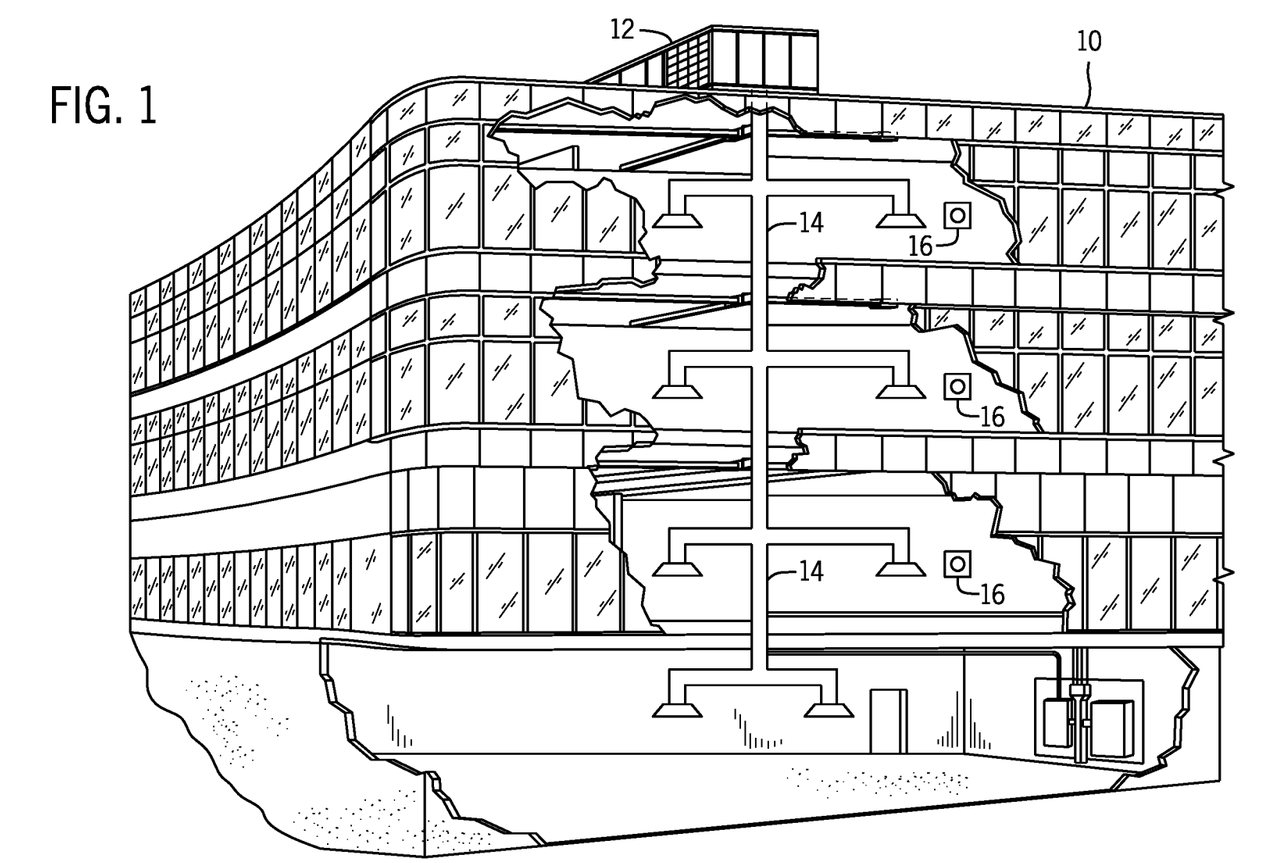
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
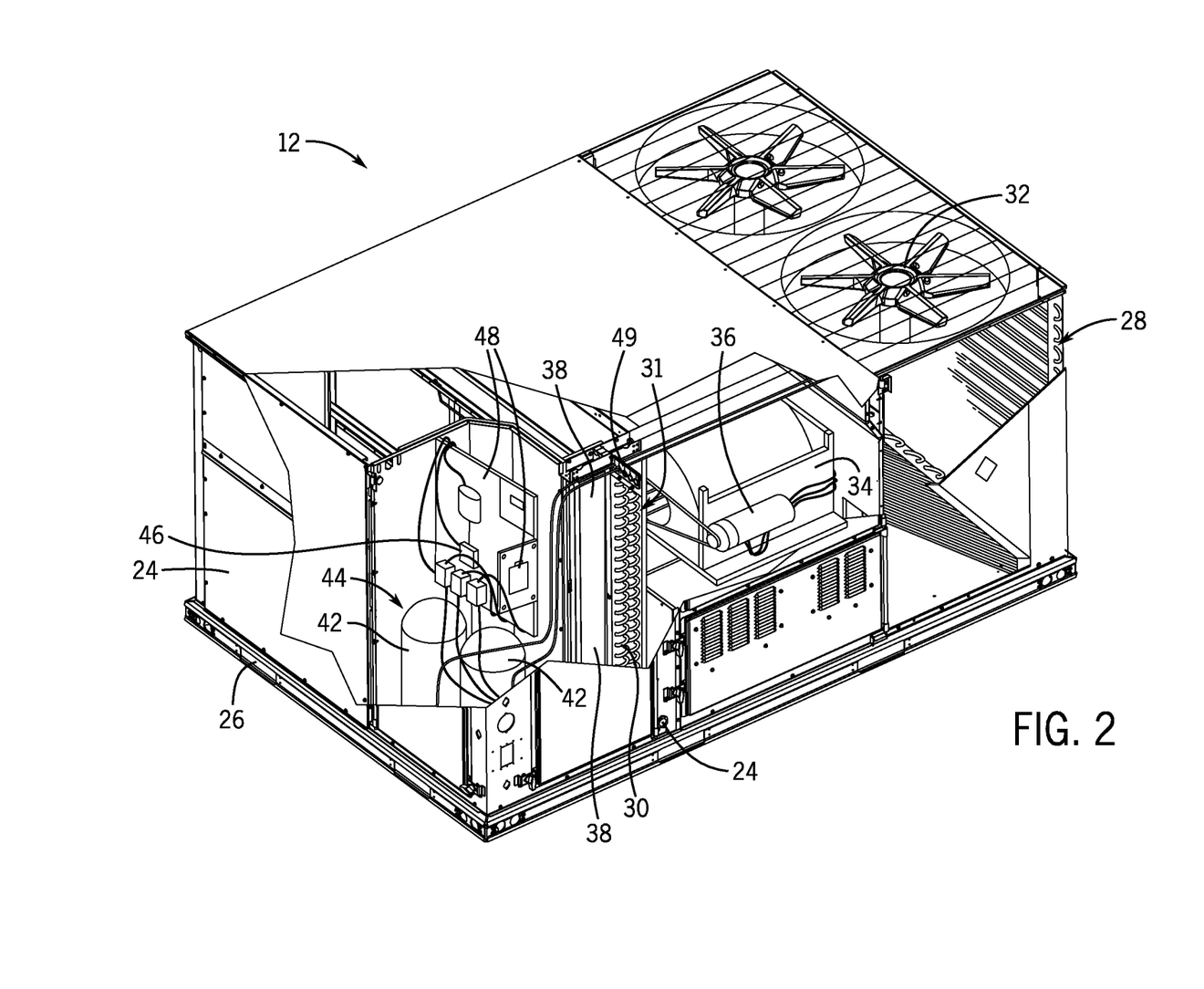
FIG. 2 is a perspective view of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
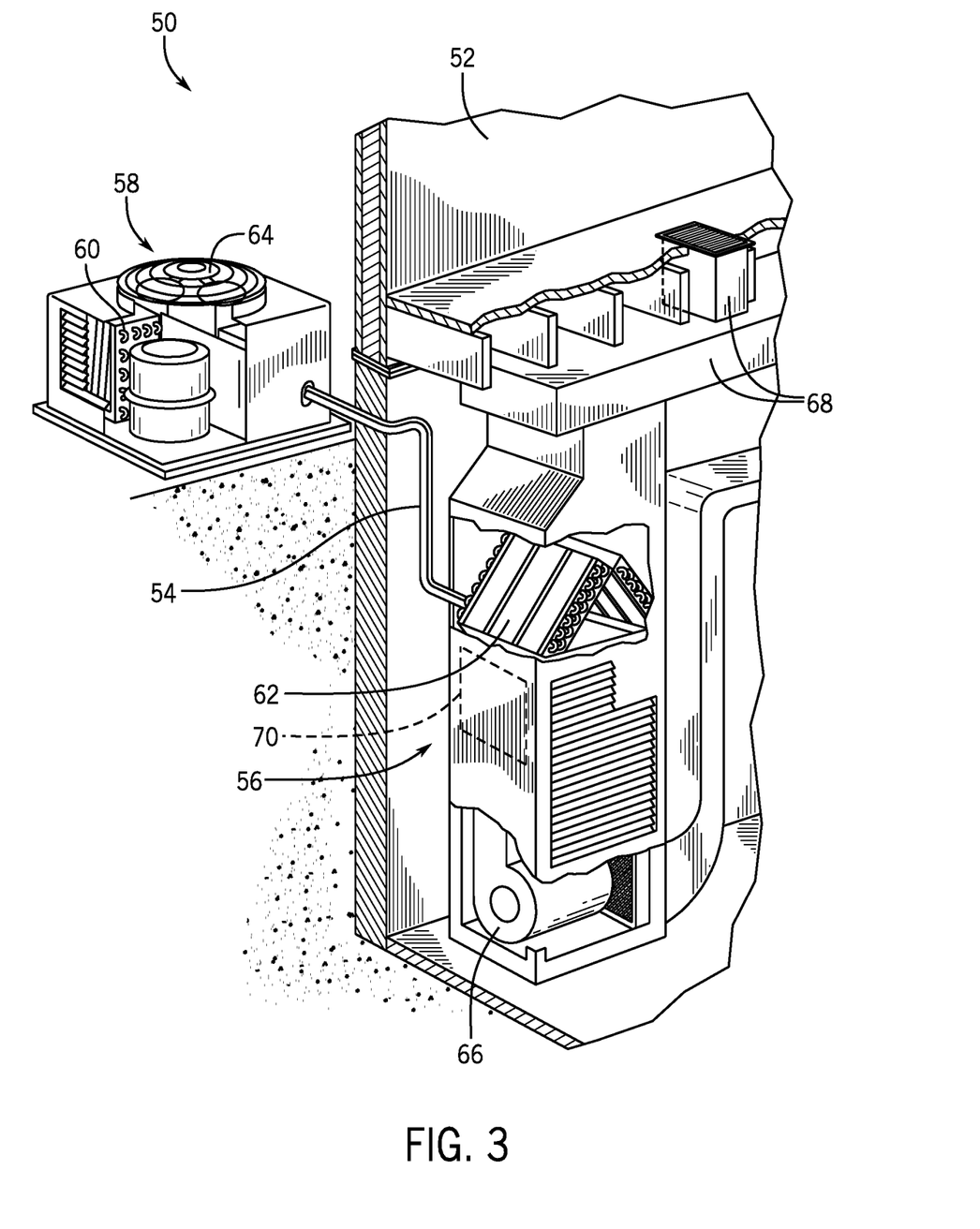
FIG. 3 is a perspective view of a residential HVAC system, in accordance with an aspect of the present disclosure.

FIG. 3 illustrates a residential heating and cooling system, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
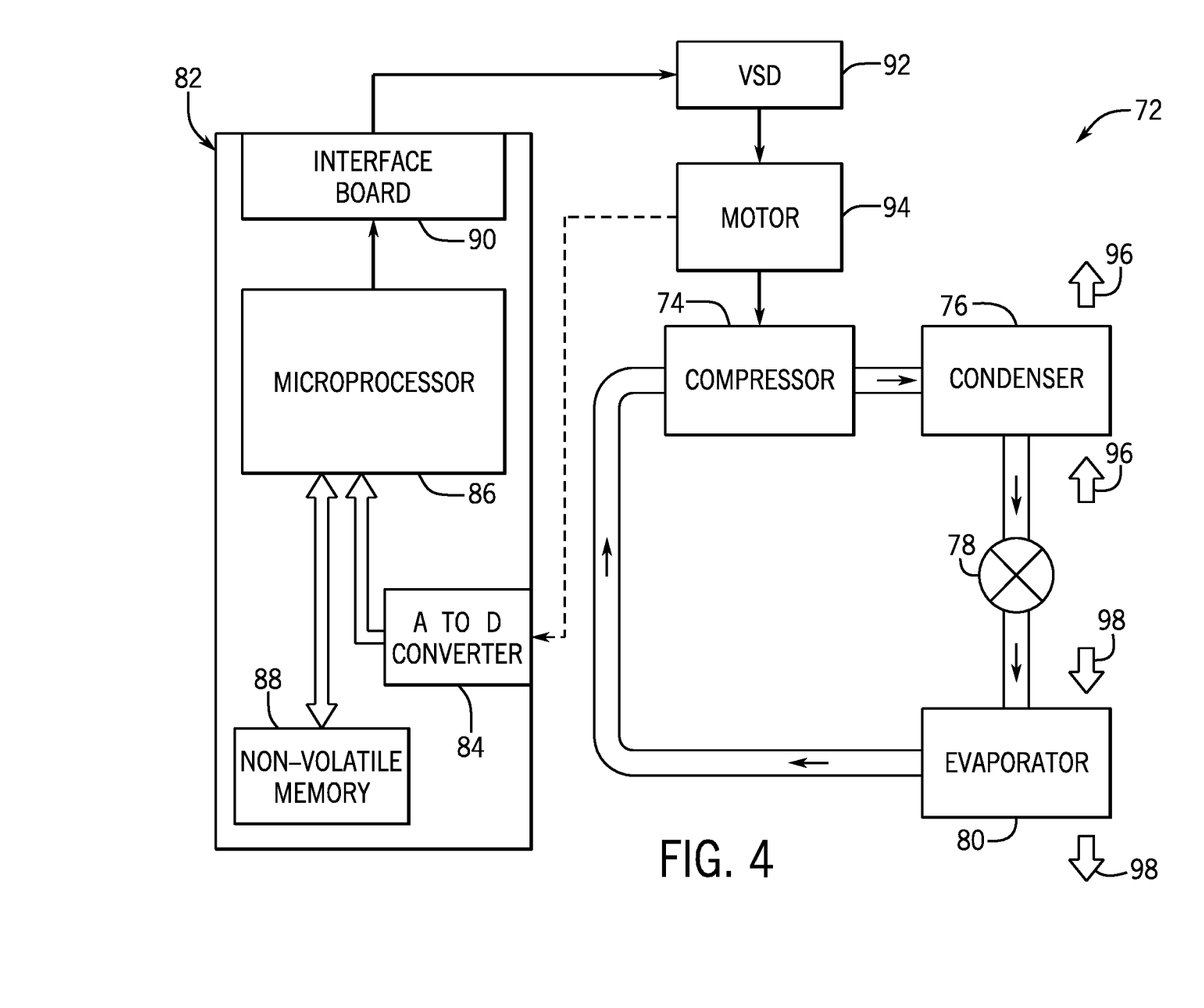
FIG. 4 is a schematic diagram of a vapor compression system that may be used in the packaged HVAC system of FIG. 2 and the residential HVAC system FIG. 3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or any other suitable HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
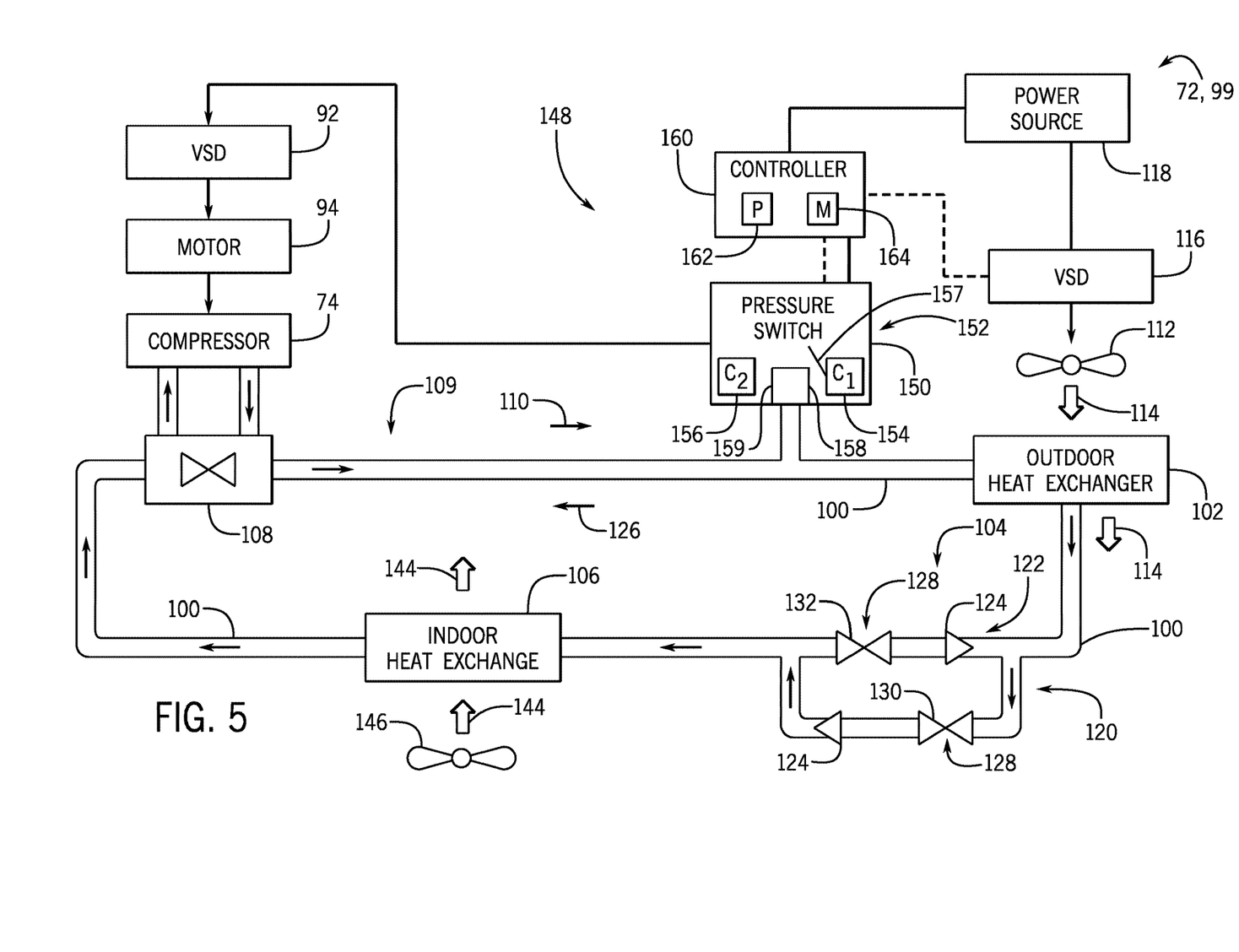
FIG. 5 is a schematic diagram of an embodiment of a heat pump vapor compression system having a pressure control system, in accordance with an aspect of the present disclosure.

With the foregoing in mind, FIG. 5 is an alternative embodiment of the vapor compression system 72 in the form of a heat pump system 99. The heat pump system 99 includes conduits 100 that fluidly couple an outdoor heat exchanger 102, an expansion valve assembly 104, an indoor heat exchanger 106, a reversing valve 108, and the compressor 74 together to form a vapor compression circuit 109 (also referred to herein as a refrigeration circuit). The reversing valve 108 adjusts a flow direction of the refrigerant along the conduits 100, and thus, enables the vapor compression system 72 to operate as a heat pump in either a heating mode or a cooling mode. For example, when the vapor compression system 72 is operating in a cooling mode, the reversing valve 108 may be disposed in a first position, such that the compressor 74 may direct hot, gaseous refrigerant in a first direction 110 from the reversing valve 108 toward the outdoor heat exchanger 102. A variable speed outdoor fan 112 is disposed adjacent to the outdoor heat exchanger 102 and configured to direct a flow of outdoor air 114 across the outdoor heat exchanger 102. As such, the outdoor air 114 absorbs thermal energy from the refrigerant flowing through the outdoor heat exchanger 102, and thus, enables the refrigerant to change phase, or condense, into a liquid. As described in greater detail herein, the variable speed outdoor fan 112 is electrically coupled to a VSD 116, which may regulate the magnitude of voltage and/or current supplied to the variable speed outdoor fan 112 from a power source 118, such as an AC or DC power source. As such, the VSD 116 enables modulation of the operational speed of the variable speed outdoor fan 112, as discussed in greater detail below.

Continuing through the example of the illustrated embodiment of the heat pump system 99 operating in cooling mode, the condensed refrigerant exits the outdoor heat exchanger 102 and flows toward the expansion valve assembly 104. The illustrated expansion valve assembly 104 includes a first flow path 120 and a second flow path 122, which are coupled to a portion of the conduits 100 in a parallel configuration. The first and second flow paths 120, 122 may each include a respective check valve 124, which may be configured to enable fluid flow in a first direction, and substantially block fluid flow in a second direction, opposite the first direction. The illustrated check valves 124 are respectively coupled to the first or second flow paths 120, 122 in opposing directions, such that the refrigerant can, for example, only flow through the first flow path 120 in the first direction 110 along the vapor compression circuit 109, and only flow through the second flow path 122 in a second direction 126 along the vapor compression circuit 109. Additionally, a pair of expansion valves 128 are coupled to, and associated with the first and second flow paths 120, 122. Accordingly, the illustrated expansion valve assembly 104 flows refrigerant through the first flow path 120, and thus through a first expansion valve 130 of the pair of expansion valves 128, when the refrigerant is flowing through the vapor compression circuit 109 along the first direction 110. Conversely, the expansion valve assembly 104 flows refrigerant through the second flow path 122, and thus through a second expansion valve 132 of the pair of expansion valves 128, when the refrigerant is flowing through the vapor compression circuit 109 along the second direction 126.

Continuing through the example of the illustrated embodiment of the heat pump system 99 operating in cooling mode, subsequent to flowing through the expansion valve assembly 104, the refrigerant flows toward the indoor heat exchanger 106 which, similar to the outdoor heat exchanger 102 discussed above, transfers thermal energy between the refrigerant and a flow of air, such as a flow of indoor air 144. In some embodiments, an indoor fan 146 may facilitate directing the indoor air 144 across the indoor heat exchanger 106. In certain embodiments, the indoor fan 146 may be powered by a VSD or a fixed-speed drive that is electrically coupled to the power source 118. Accordingly, refrigerant within the indoor heat exchanger 106 absorbs thermal energy from the flow of indoor air 144, such that indoor air 144 may be conditioned, or cooled. It should be noted that in certain embodiments, the indoor heat exchanger 106 may be a passive heat exchanger, such as a radiator, heat pipes, or the like. In such embodiments, the indoor fan 146 may be omitted from the vapor compression system 72. In any case, the refrigerant within the indoor heat exchanger 106 may absorb sufficient thermal energy to change phase, or boil, such that the refrigerant may discharge form the indoor heat exchanger 106 in a heated, gaseous phase. After passing through the indoor heat exchanger 106, the refrigerant flows toward the compressor 74 and thus, completes the cycle or circuit through the heat pump system 99 operating in cooling mode.

As discussed above, the reversing valve 108 may be configured to reverse a flow direction of the refrigerant within the conduits 100 between, for example, the first direction 110 and the second direction 126, and thus, enable the heat pump system 99 to operate in a cooling mode or a heating mode, respectively. For example, when the reversing valve 108 is positioned to direct refrigerant through the vapor compression circuit 109 in the second direction 126 rather than the first direction 110, heated refrigerant from the compressor 74 is directed toward the indoor heat exchanger 106, as opposed to the outdoor heat exchanger 102. As such, the indoor heat exchanger 106 is configured to heat the indoor air 144, by causing the indoor air 144 to absorb thermal energy from the heated refrigerant flowing therein. The refrigerant subsequently flows through the second flow path 122 of the expansion valve assembly 104, the outdoor heat exchanger 102, and returns to the compressor 74 to complete the cycle or circuit through the heat pump system 99 while operating in heating mode.

The embodiment of the heat pump system 99 illustrated in FIG. 5 includes a pressure control system 148. The illustrated pressure control system 148 includes a pressure activated device 150 that is fluidly coupled to a portion the conduits 100 and configured to monitor a refrigerant pressure within the vapor compression system 72. Although the pressure activated device 150 is disposed along a portion of the conduits 100 extending between the reversing valve 108 and the outdoor heat exchanger 102 in the illustrative embodiment, it should be noted that the pressure activated device 150 may be disposed along any other suitable portion of the conduit 100. For example, the pressure activated device 150 may be disposed between the outdoor heat exchanger 102 and the expansion valve assembly 104, the expansion valve assembly 104 and the indoor heat exchanger 106, and so forth. Additionally, in certain embodiments, the heat pump system 99 may include multiple pressure activated devices disposed in different portions of the vapor compression circuit 109. For example, in an embodiment, the heat pump system 99 may include a first pressure activated device disposed between the reversing valve 108 and the outdoor heat exchanger 102, and include a second pressure activated device disposed between the reversing valve 108 and the indoor heat exchanger 106.

In some embodiments, excess thermal energy may accumulate within the refrigerant during abnormal operational conditions of the vapor compression system 72, such as when an ambient static pressure near the indoor heat exchanger 106 is relatively large. This abnormal condition can result, for example, when debris block a portion of the outdoor or indoor heat exchangers 102, 106, or when a portion of the conduits 100 is constricted due to an obstruction within the conduit 100. The refrigerant within the conduit 100 expands due to this accumulation of thermal energy, such that a pressure of the refrigerant increases above a predetermine threshold pressure or, in other words, deviates from a predetermined operating pressure range. As described in greater detail herein, the pressure activated device 150 is configured to block or interrupt a compressor signal, such as an electrical current flowing between the controller 160 and the VSD 92, when a refrigerant pressure within the conduit 100 exceeds the predetermined threshold pressure, and thus, deactivate the compressor 74. It may be appreciated that, in certain embodiments, the compressor signal is an electrical signal that directly powers the VSD 92, the motor 94, and/or the compressor 74. In other embodiments, the VSD 92, the motor 94, and/or the compressor 74 receive a separate supply of electrical power and the compressor signal is a data or instruction signal that triggers activation and operation of these components. Accordingly, the pressure activated device 150 may reduce wear on the compressor 74 that may occur while operating the compressor 74 outside of the desired operating pressure range, and thus, enhance an operational life of the compressor 74, the motor 94 powering the compressor 74, or both.

For example, the illustrated embodiment of the pressure activated device 150 includes a pair of contacts 152, namely a first contact 154 and a second contact 156, as well as a switching element 157. As such, the switching element 157 of the pressure activated device 150 is configured to move between an engaged configuration, or an engaged position (also referred to as a closed electrical circuit position), and a disengaged configuration, or a disengaged position (also referred to as an open electrical circuit position). For the illustrated embodiment, the first contact 154 is electrically coupled to the controller 160, while the second contact 156 is electrically coupled to the VSD 92. As described in greater detail herein, the controller 160 is electrically coupled to the power supply 118. Accordingly, the switching element 157 of the pressure activated device 150 enables or disables (e.g., unblocks or blocks) a flow of electrical current between the contacts 152, and thus between the controller 160 and the VSD 92, when the switching element 157 is in the engaged or disengaged positions, respectively. It should be noted that in certain embodiments, the motor 94 may operate without the VSD 92, and thus, the second contact 156 may be electrically coupled directly to the motor 94.

For the illustrated embodiment, the pressure activated device 150 includes a sensing portion 158 that is configured to move the switching element 157 between the engaged and disengaged positions in response to pressure fluctuations within the vapor compression system 72. For example, the illustrated sensing portion 158 includes a piston 159 disposed within a chamber that is fluidly coupled to a portion of the conduits 100. The piston 159 is configured to move longitudinally within the chamber and disengage the switching element 157 from bridging the first and second contacts 154, 156 when a pressure within the conduit 100 exceeds the predetermined threshold pressure. The sensing portion 158 may be calibrated, for example, using a spring element disposed above the piston 159 and/or the switching element 157, such that a magnitude of the predetermined threshold pressure may be adjusted. In other embodiments, the pressure activated device 150 may include any other suitable hydraulic pressure sensing instrument or pressure switch that may be configured to move the switching element 157 to the disengaged position when the refrigerant pressure within the conduit 100 exceeds the predetermined threshold pressure. In still other embodiments, the pressure activated device 150 may include an electronic pressure sensor operably coupled to a relay that interrupts the electrical flow between the power source 118 and the VSD 92.

Additionally, for the illustrated embodiment, the pressure activated device 150 is communicatively coupled to the controller 160 of the pressure control system 148, which may be used to control certain components of the vapor compression system 72 in addition to, or in lieu of, the control panel 82. For example, one or more control transfer devices, such as wires, cables, wireless communication devices, and the like, may communicatively couple the pressure activated device 150, the VSD 92, the additional VSD 116, or any other suitable components of the vapor compression system 72 to the controller 160. The controller 160 may include a processor 162, such as a microprocessor, which executes software instructions for controlling the components of the vapor compression system 72. Moreover, the processor 162 may include multiple microprocessors, one or more "general-purpose" microprocessors, one or more special-purpose microprocessors, and/or one or more application specific integrated circuits (ASICS), or some combination thereof. For example, the processor 162 may include one or more reduced instruction set (RISC) processors.

For the illustrated embodiment, the controller 160 also includes a memory device 164 that stores information such as control software, look up tables, configuration data, and so forth. The memory device 164 may include a volatile memory, such as random access memory (RAM), and/or a nonvolatile memory, such as read-only memory (ROM). The memory device 164 may store a variety of information for various purposes. For example, the memory device 164 may store processor-executable instructions including firmware or software for the processor 162 execute, such as instructions for controlling the pressure activated device 150, VSD 92, VSD 116, or any other suitable components of the vapor compression system 72. In some embodiments, the memory device 164 is a tangible, non-transitory, machine-readable-medium that stores machine-readable instructions for the processor 162 to execute. The memory device 164 may include ROM, flash memory, a hard drive, or any other suitable optical, magnetic, or solid-state storage medium, or a combination thereof. Accordingly, the memory device 164 may store any suitable data and/or instructions to facilitate the control strategies set forth herein.

In some embodiments, the controller 160 may measure a disengagement time of the pressure activated device 150 or, in other words, a time period during which the switching element 157 of the pressure activated device 150 is disposed in the disengaged position. If a disengagement time of the pressure activated device 150 exceeds a predetermine threshold time period, the controller 160 may be configured to deactivate the compressor signal that is provided to the first contact 154, such that compressor operation will not immediately resume when the switching element 157 of the pressure activated device 150 returns to the engaged position. In some embodiments, a duration of the predetermined threshold time period may be between approximately 30 milliseconds (ms) and approximately 50 ms, such as approximately 40 ms. The predetermined threshold time period generally allows for short-duration increases in refrigerant pressure that may not be indicative of an abnormal pressure condition. It should be noted that, in other embodiments, the duration of the predetermined threshold time period may be less than, or greater than 40 ms. In other embodiments, the controller 160 may electrically decouple the first contact 154 from the power source 118 using, for example, an actuator coupled to an analogue switch, a metal-oxide-semiconductor field-effect transistor (MOSFET), or any other suitable instrument to interrupt the flow of electrical current between the first contact 154 and the power source 118.

When the controller 160 determines that the disengagement time of the pressure activated device 150 exceeds to the predetermined threshold time period, the controller 160 may also instruct the VSD 116 to increase a speed of the variable speed outdoor fan 112 to a target speed, such that the variable speed outdoor fan 112 can enhance a rate of heat transfer between the outdoor heat exchanger 102 and the outdoor air 114, and thus, facilitate removing the accumulated thermal energy from the heat pump system 99. A magnitude of the target speed may be determined based off a capacity, or a tonnage (TON) of the heat pump system 99, whether the vapor compression system 72 is operation in the cooling mode or in the heating mode, or a combination thereof.

For example, the target speed may be indicative of a predetermined frequency, or duty cycle percentage of the electrical current supplied to the variable speed outdoor fan 112 by the VSD 116. The controller 160 may instruct the VSD 116 to adjust the duty cycle of the electrical current using signal modulation techniques such as pulse width modulation (PWM). As shown in Table 1, the percentage of the duty cycle may be predetermined based on the capacity and operational mode of the vapor compression system 72. As a non-limiting example, when the heat pump system 99 has a 2 TON capacity and is operating in a cooling mode, the controller 160 may instruct the VSD 116 to adjust a duty cycle of the supplied electrical current to 64 percent. As such, the duty cycle percentage may be indicative of the target speed of the variable speed outdoor fan 112. In other words, a relatively large duty cycle percentage may be indicative of a target speed that is relatively large while, conversely, a relatively small duty cycle percentage may be indicative of a target speed that is relatively small. It should be noted that the duty cycle percentages shown in Table 1 are by way of example only, and may be greater than or less than those shown in Table 1 in certain embodiments of the pressure control system 148.

TABLE 1

Target speeds for variable speed outdoor fan of heat pump system based on tonnage and operational mode.

| Capacity (Tonnage) | Maximum PWM % |
|---|---|
| Heat Pump mode: | Cooling |
| 2-TON | 64 |
| 3-TON | 62 |
| 4-TON | 62 |
| 5-TON | 62 |
| Heat Pump mode: | Heating |
| 2-TON | 62 |
| 3-TON | 62 |
| 4-TON | 62 |
| 5-TON | 64 |

In some embodiments, the controller 160 may instruct the VSD 116 to operate the variable speed outdoor fan 112 at the target speed for an equilibration time. The equilibration time is a predefined period of time that enables the variable speed outdoor fan 112 to remove sufficient thermal energy from the heat pump system 99, such that a pressure of the refrigerant within the vapor compression circuit 109 falls below the predetermine threshold pressure. Accordingly, the switching element 157 of the pressure activated device 150 moves from the disengaged position to the engaged position at some point within the equilibration time. However, as noted above, since the compressor signal is not provided by the controller 160 during the equilibration time, the compressor 74 cannot resume operation during the equilibration time. In some embodiments, a length or duration of the equilibration time may be between approximately 4 and 6 minutes, such as approximately 5.5 minutes. However, in other embodiments, the equilibration time may have any suitable predetermined duration, such as 1 minute, 2 minutes, 3 minutes, 10 minutes, and so forth. The duration of the equilibration time may be predetermined using computer simulation tools, such as computational fluid dynamics (CFD), which may be used to estimate a minimum time period that enables the heat pump system 99 to dissipate a sufficient amount of thermal energy such that the refrigerant pressure may fall below the predetermined threshold pressure. In other embodiments, the duration of the equilibration time may be empirically predetermined via experimental trials.

In some embodiments, the predetermined duration of the equilibration time is stored in the memory device 164. The controller 160 may initiate a timer using, for example, the processor 162, when the disengagement time of the pressure activated device 150 exceeds the predetermined threshold time period (e.g., 40 ms), as mentioned. The controller 160 may compare a time value of the timer to an equilibration time duration value stored on the memory device 164 and continuously operate the variable speed outdoor fan 112 at the target speed while the time value of the timer is less than the equilibration time duration value. Accordingly, the controller 160 may ensure that sufficient thermal energy has been removed from the vapor compression system 72 such that a magnitude of the refrigerant pressure within the vapor compression circuit 109 is within a suitable operating range or, in other words, below the predetermined threshold pressure.

It should be noted that in certain embodiments, the controller 160 may additionally operate the indoor fan 146 during the equilibration time in addition to the variable speed outdoor fan 112. For example, the controller 160 may instruct a VSD (not illustrated) associated with the indoor fan 146 to increase a speed of the indoor fan 146 to a second target speed throughout the equilibration time. The second target speed may be different than, or substantially equal to, the target speed of the variable speed outdoor fan 112, in certain embodiments. Accordingly, the indoor fan 146 may also facilitate heat transfer between the indoor heat exchanger 106 and the indoor air 144, and thus, additionally facilitate dissipation of the accumulated thermal energy from the heat pump system 99. In still further embodiments, additional fans may be disposed adjacent to the compressor 74, or any other suitable portion of the heat pump system 99, such that the controller 160 may operate such additional fans during the predetermined equilibration time, and thus, further enhance heat transfer between the vapor compression system 72 and the environment.

When the equilibration time has fully lapsed, the controller 160 may instruct the VSD 116 to reduce a speed of the variable speed outdoor fan 112 from the target speed to a normal operating speed. Additionally, the controller 160 may, once again, provide the compressor signal to the first contact 154 by electrically coupling the power source 118 to the first contact 154. Since the switching element 157 of the pressure activated device 150 reengaged the contacts 152 during the equilibrium time, the compressor signal flows between the controller 160 and the variable speed drive 92 of the motor 94 of the compressor 74. Accordingly, the heat pump system 99 resumes normal operation after the predetermined equilibration time ends or concludes. As such, the pressure control system 148 ensures that the compressor 74 is not reactivated until the refrigerant pressure within the vapor compression circuit 109 is within a desirable operating range, which may reduce wear on the compressor 74 and enhance an operational life of the compressor 74.

Figure 6:
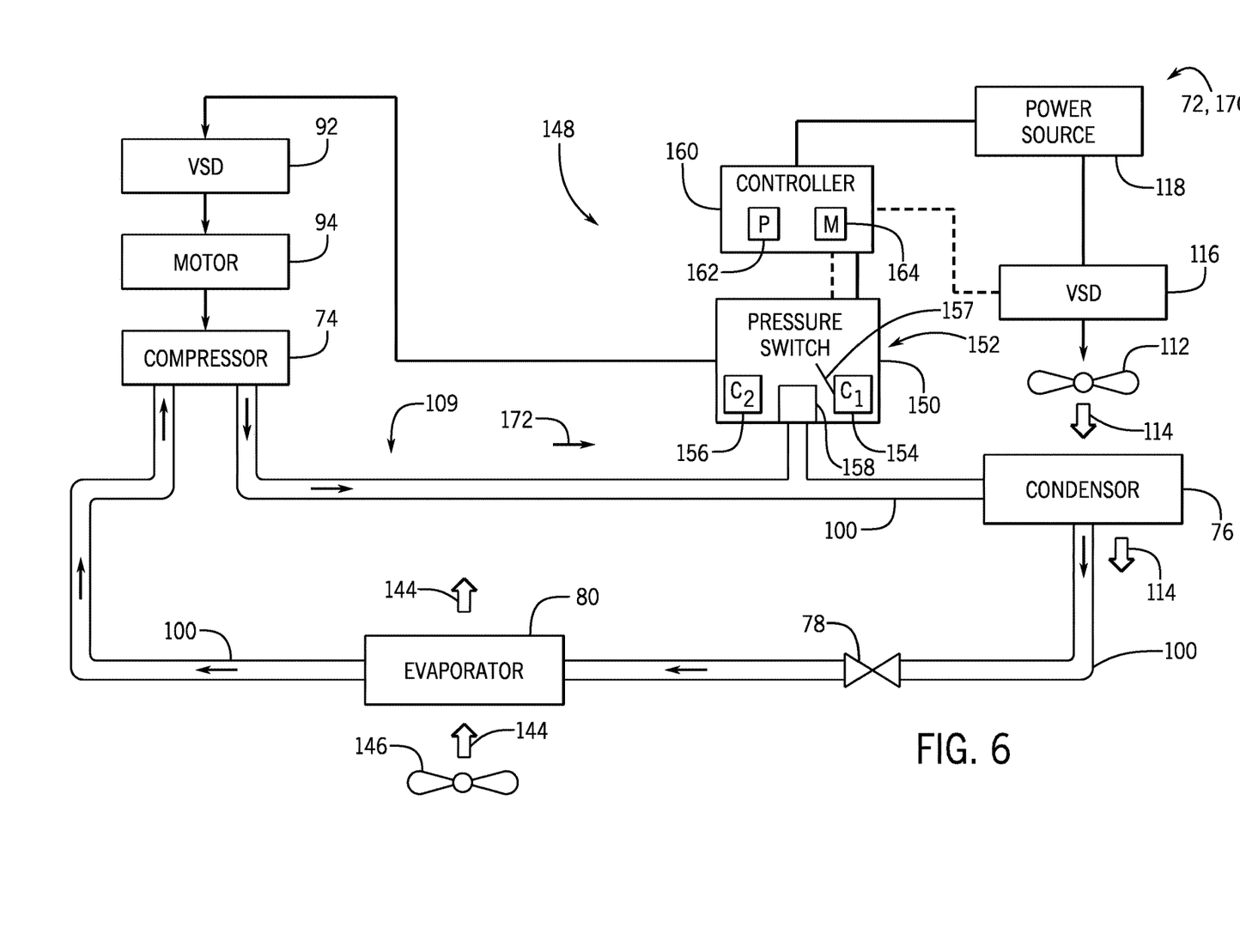
FIG. 6 is a schematic diagram of an embodiment of an air conditioner vapor compression system having the pressure control system, in accordance with an aspect of the present disclosure.

FIG. 6 is an alternative embodiment of the vapor compression system 72 in the form of an air conditioning system 170. Unlike the heat pump system 99 of FIG. 5, in the illustrated air conditioning system 170, the refrigerant has a single, fixed flow direction 172 through the vapor compression circuit 109 to enable the HVAC unit 12 operate in a cooling mode. For example, conduits 100 fluidly couple the condenser 76, the expansion valve 78, and the evaporator 80 to the compressor 74 to form the vapor compression circuit 109. Similar to the discussion above, the pressure activated device 150 may be configured to monitor a pressure of the refrigerant within a portion of the vapor compression circuit 109 and temporarily interrupt a compressor signal provided by the controller 160 when the pressure exceeds the predetermined threshold pressure. As with the heat pump system 99 of FIG. 5, the controller 160 of the air conditioning system 170 monitors the disengagement time of the pressure activated device 150 and deactivates the compressor signal supplied to the first contact 154 when the disengagement time exceeds the predetermined threshold time period. As discussed, when the disengagement time exceeds the predetermined threshold time period, the controller 160 operates the variable speed outdoor fan 112 at the target speed throughout the equilibration time, such that the variable speed outdoor fan 112 facilitates heat transfer between the condenser 76 and the outdoor air 114, and thus, facilitates removal of thermal energy from the air conditioning system 170. Similar to the discussion above, the controller 160 may also instruct the indoor fan 146, or any additional fans disposed along the air condition system 170, to operate based on a second target speed during the equilibration time.

It may be appreciated that the target speed of the variable speed outdoor fan 112 may be different when the vapor compression system 72 is a heat pump system 99, such as in the illustrative embodiment of FIG. 5, as compared to when the vapor compression system 72 is an air conditioning system 170, such as in the illustrative embodiment of FIG. 6. For example, when the vapor compression system 72 is an air conditioning system 170, a duty cycle percentage generated by the VSD 116 during the equilibration time, and thus, the target speed of the variable speed outdoor fan 112, may be determined based of a capacity of the air conditioning system 170, as shown in Table 2. For example, when the air conditioning system 170 has a 2 TON capacity and is operating in a cooling mode, the controller 160 may instruct the VSD 116 to adjust a duty cycle of the supplied electrical current to 55 percent. It should be noted that the duty cycle percentages shown in Table 2 are by way of example only, and may be greater than or less than those shown in Table 2 in certain embodiments of the pressure control system 148.

TABLE 2

Target speeds for variable speed outdoor fan of an air conditioning system based on tonnage and operational mode.

| Capacity (Tonnage) | Maximum PWM % |
|---|---|
| 2-TON | 55 |
| 3-TON | 52 |
| 4-TON | 65 |
| 5-TON | 65 |

Figure 7:
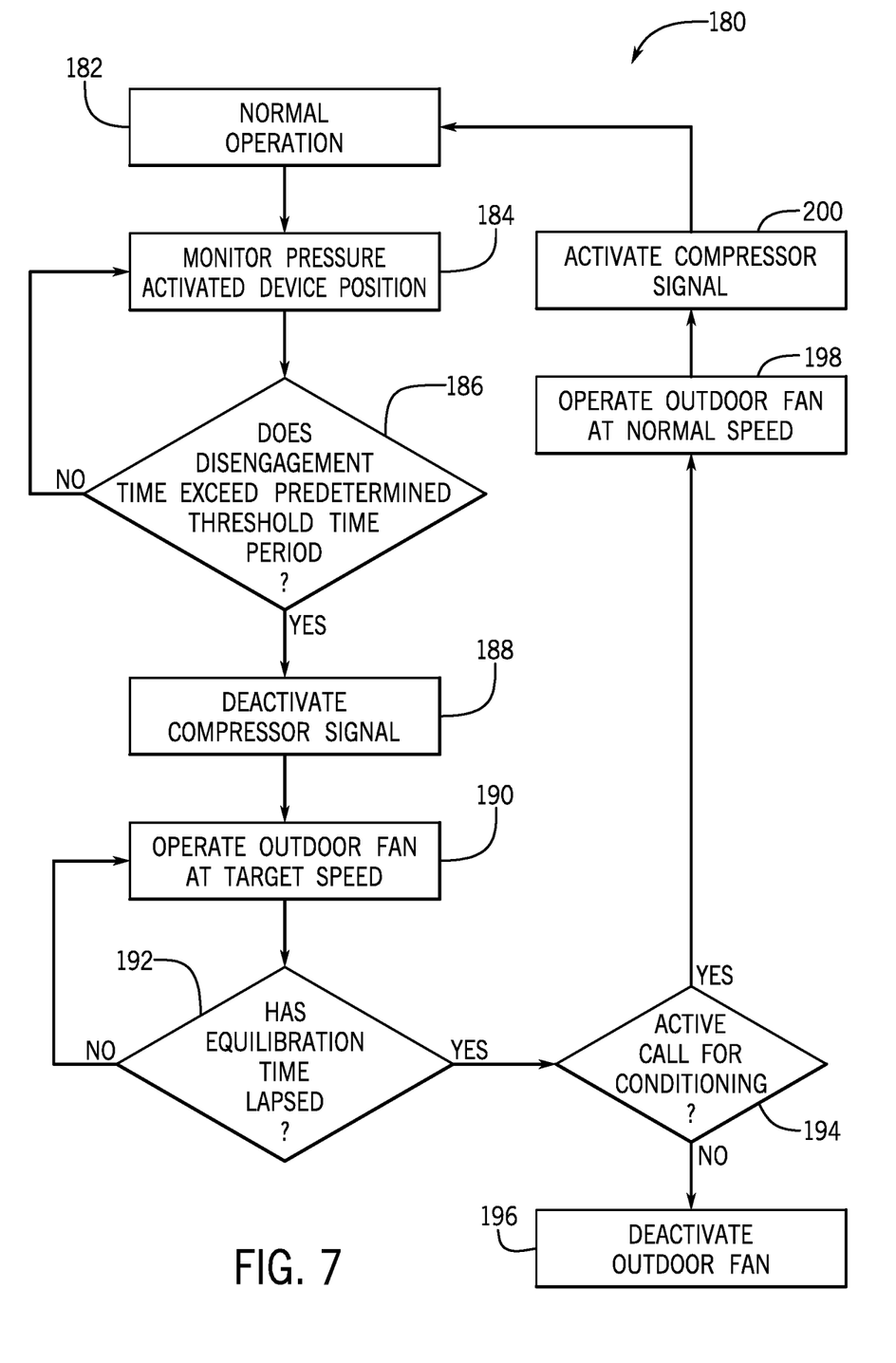
FIG. 7 is a flow diagram of an embodiment of a process of operating the vapor compression systems of FIGS. 5 and 6, in accordance with an aspect of the present disclosure.

With the foregoing in mind, FIG. 7 is a flow diagram of an embodiment of a process 180 of operating the vapor compression system 72 (e.g., the heat pump system 99 of FIG. 5, the air conditioning system 170 of FIG. 6) using the pressure control system 148. The illustrated embodiment of the process 180 includes normally operating the vapor compression system 72, as indicated by block 182, such that the vapor compression system 72 may be used to transfer thermal energy between the interior conditioned space of a building and the outdoor environment. The controller 160 monitors a position of the pressure activated device 150 during operation of the vapor compression system 72, as indicated by block 184. For example, the controller 160 may be communicatively coupled to the pressure activated device 150, such that the controller 160 can determine whether the switching element 157 of the pressure activated device 150 is disposed in an engaged position or a disengaged position. If the switching element 157 of the pressure activated device 150 moves to the disengaged position due to a pressure deviation within the vapor compression circuit 109, such as when the refrigerant pressure exceeds the predetermined threshold pressure, the controller 160 monitors a disengagement time of the pressure activated device 150. The controller 160 then determines whether the disengagement time exceeds a predetermined threshold time period, as indicated by decision block 186. When the disengagement time is less than the predetermined threshold time period, the controller 160 may continue to monitor a position of the pressure activated device 150, as indicated by process block 184.

Continuing through the embodiment of the process 180 illustrated in FIG. 7, when the disengagement time exceeds the predetermined threshold time, the controller 160 deactivates the compressor signal, as indicated by process block 188. For example, the controller 160 may deactivate the compressor signal provided to the first contact 154 of the pressure activated device 150. For the illustrated embodiment, the controller 160 also simultaneously instructs the VSD 116 to increase an operating speed of the variable speed outdoor fan 112 to a predetermined target speed, as indicated by process block 190. As discussed above, the target speed may be predetermined based on the capacity and operational mode of the vapor compression system 72. In some embodiments, the controller 160 may additionally instruct the indoor fan 146, and/or any other suitable fan(s) associated with the vapor compression system 72 to operate based on a second target speed, which may be substantially equal to, or different than, the target speed of the variable speed outdoor fan 112.

The controller 160 may also initiate a timer, for example, using the processor 162, when the controller 160 determines that the disengagement time of the pressure activated device 150 has exceeded the predetermined threshold time period in block 186. As such, in the illustrated embodiment, the controller 160 subsequently compares a time value of the timer to the predetermined duration of the equilibration time, as indicated by block 192. If the equilibration time has not lapsed or, in other words, if a time value of the timer is less than the predetermined duration of the equilibration time, the controller 160 continues to operate the variable speed outdoor fan 112 at the target speed, and/or operate the indoor fan 146 at the second target speed, regardless of a call for conditioning (e.g., by the thermostat). Accordingly, the variable speed outdoor fan 112, the indoor fan 146, or any other additional fan(s) disposed along the vapor compression system 72 continue to remove accumulated thermal energy from the vapor compression system 72 for the duration of the equilibration time. The variable speed outdoor fan 112, the indoor fan 146, and/or the additional fan(s) may remove a sufficient amount of thermal energy from the vapor compression system 72 during the equilibration time to considerably reduce the temperature of the refrigerant, and thus, enable the refrigerant pressure within the vapor compression circuit 109 to fall below the predetermined threshold pressure. As such, at some point during the equilibration time, the switching element 157 of the pressure activated device 150 moves from the disengaged position to the engaged position. However, since the compressor signal was previously deactivated at block 188, the VSD 92, motor 94, and compressor 74 remain deactivated.

For the embodiment of the process 180 illustrated in FIG. 7, when the equilibration time has fully lapsed, the controller 160 determines whether there is an active call for conditioning, as indicated by block 194. For example, the call for conditioning, when active, may be a signal provided by a thermostat of the HVAC system based on a temperature within the building 10. When there is not an active call for conditioning, the controller 160 instructs the VSD 116 to deactivate the variable speed outdoor fan 112, as indicated by block 196. Accordingly, both the variable speed outdoor fan 112 and the compressor 74 remain inactive until another call for conditioning is received.

For the illustrated embodiment, when an active call for conditioning remains after the equilibration time has lapsed, the controller 160 instructs the variable speed outdoor fan 112, the indoor fan 146, and/or the additional fan(s) to operate based on a normal operational speed, as indicated by process block 198. The controller 160 also provides the compressor signal to the first contact 154 of the pressure activated device 150, as indicated by process block 200. Accordingly, since the pressure activated device 150 returned to the engaged position during the equilibration time, the VSD 92 is activated by the compressor signal, the motor 94 engages the compressor 74, and the compressor 74 circulates refrigerant through the vapor compression circuit 109. Accordingly, the pressure control system 148 temporarily disables operation of the compressor 74 and increases the speed of the variable speed outdoor fan 112 when a pressure of the refrigerant within the vapor compression circuit 109 exceeds a desired operating range, which may reduce wear on the compressor 74 and/or other components of the vapor compression system 72. The pressure control system 148 may additionally block reactivation of the compressor 74 until a refrigerant pressure within the vapor compression circuit 109 is within a suitable operating range or, in other words, until the refrigerant pressure is below the predetermined threshold pressure.

It should be noted that, in some situations, a pressure of the refrigerant may still exceed the predetermined threshold pressure after the equilibration time has lapsed. As such, the switching element 157 of the pressure activated device 150 may be disposed in the disengaged position when the equilibration time lapses. In such situations, the controller 160 may be configured to continue to run the variable speed outdoor fan 112, the indoor fan 146, and/or the additional fan(s) at respective target speeds for an additional time increment, or until the switching element 157 of the pressure activated device 150 moves to the engaged position. In certain embodiments, if the controller 160 determines that the switching element 157 has not returned to the engaged position at the conclusion of the equilibration time, the controller 160 may enter a fault condition, and the controller 160 may not provide the compressor signal to activate the compressor 74 until the fault condition has been cleared, for example, by a service technician.

In certain embodiments, reactivating the compressor 74 while the variable speed outdoor fan 112 is already running may also reduce a total power draw of the vapor compression system 72 during reactivation, after the equilibration time lapses. That is, conventional vapor compression systems typically activate the compressor and the variable speed outdoor fan simultaneously, for example, at the end of an equilibration time. It is recognized that this simultaneous reactivation can result in a substantially large power draw that reduces the efficiency of HVAC system, as well as potentially increase wear or cause damage to certain components of the HVAC system. As such, it is recognized that by activating the compressor 74 while the variable speed outdoor fan 112 is already activated reduces the total power draw by the vapor compression system 72 during reactivation after the lapse of the equilibration time, improving the efficiency of the HVAC system and limiting or reducing wear of certain components of the HVAC system, such as power transmission and conversion components of the vapor compression system (e.g., transmission lines and transformers).

As discussed above, the aforementioned embodiments of the pressure control system 148 may be used on the HVAC unit 12, the residential heating and cooling system 50, or in any other suitable HVAC system. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A heating, ventilation, and air conditioning (HVAC) unit, comprising:
    a vapor compression circuit including a compressor and a heat exchanger;
    a controller configured to provide a first signal to operate the compressor, and configured to provide a second signal to control a variable speed fan associated with the heat exchanger based on a target speed; and
    a pressure activated device communicatively coupled between the controller and the compressor, wherein the pressure activated device is configured to temporarily block transmission of the first signal from the controller to the compressor to temporarily block operation of the compressor while a refrigerant pressure within the vapor compression circuit is greater than a threshold value, and wherein, in response to determining that the pressure activated device has blocked the transmission of the first signal for less than a threshold time period, the controller is configured to continue providing the first signal, and, in response to determining that the pressure activated device has blocked the transmission of the first signal for at least the threshold time period, the controller is configured to both deactivate the first signal and provide the second signal for a predetermined equilibration time.

2. The HVAC unit of claim 1, wherein, after the first signal has been deactivated, the controller is configured to reactivate the first signal while the variable speed fan is operating when there is an active call for compressor operation present at a conclusion of the predetermined equilibration time.

3. The HVAC unit of claim 1, wherein the controller is configured to provide a third signal that controls the variable speed fan associated with the heat exchanger based on a different target speed while the compressor is operating and the refrigerant pressure is below the threshold value.

4. The HVAC unit of claim 1, comprising a variable speed drive (VSD) and a motor coupled between the pressure activated device and the compressor, wherein the VSD is configured to receive the first signal and to operate the motor, and wherein the compressor is configured to operate in response to the operation of the motor.

5. The HVAC unit of claim 1, wherein the target speed is based on a type, a mode, and a tonnage of the HVAC unit.

6. The HVAC unit of claim 5, wherein the target speed corresponds to 55% of a duty cycle of the variable speed fan for a two-ton air conditioning unit in cooling mode, 52% of the duty cycle for a three-ton air conditioning unit in cooling mode, or 65% of the duty cycle for a four-ton or five ton air conditioning unit in cooling mode.

7. The HVAC unit of claim 5, wherein the target speed corresponds to 64% of a duty cycle of the variable speed fan for a two-ton heat pump unit in cooling mode, 62% of the duty cycle for a three-ton, four-ton, or five-ton heat pump unit in cooling mode, or 65% of the duty cycle for a four-ton or five ton air conditioning unit in cooling mode.

8. The HVAC unit of claim 5, wherein the target speed corresponds to 62% of a duty cycle of the variable speed fan for a two-ton, three-ton, or four-ton heat pump unit in heating mode, or 64% of the duty cycle for a five-ton heat pump unit in heating mode.

9. The HVAC unit of claim 1, wherein the pressure activated device is configured to enable transmission of the first signal to operate the compressor while the refrigerant pressure within the vapor compression circuit is less than the threshold value, and wherein, after transmission of the first signal has been blocked, the pressure activated device is configured to unblock transmission of the first signal when the refrigerant pressure within the vapor compression circuit falls below the threshold value during the predetermined equilibration time.

10. The HVAC unit of claim 1, wherein the heat exchanger is an outdoor heat exchanger of the HVAC unit.

11. The HVAC unit of claim 1, comprising the variable speed fan, wherein the variable speed fan is a first variable speed fan, wherein the heat exchanger is an outdoor heat exchanger of the vapor compression circuit associated with the first variable speed fan, and wherein the pressure activated device is configured to transition between an engaged configuration to enable the transmission of the first signal from the controller to the compressor and a disengaged configuration to temporarily block the transmission of the first signal from the controller to the compressor while the refrigerant pressure within the vapor compression circuit is greater than the threshold value.

12. The HVAC unit of claim 1, wherein the predetermined equilibration time is between 4 minutes and 6 minutes.

13. The HVAC unit of claim 1, wherein the threshold time period is between 30 and 50 milliseconds.

14. The HVAC unit of claim 11, further comprising a second variable speed fan associated with an indoor heat exchanger of the vapor compression circuit, wherein the controller is configured to operate the second variable speed fan based on a second target speed for the predetermined equilibration time in response to determining that the pressure activated device is disposed in the disengaged configuration for at least the threshold time period.

15. The HVAC unit of claim 1, wherein, when the refrigerant pressure is greater than the threshold value, the pressure activated device is configured to transition to a disengaged configuration to temporarily block the transmission of the first signal from the controller to the compressor and, when the refrigerant pressure is less than the threshold value, the pressure activated device is configured to transition to an engaged configuration to enable the transmission of the first signal from the controller to the compressor, wherein a duration of the predetermined equilibration time enables the refrigerant pressure within the vapor compression circuit to decrease below the threshold value to allow the pressure activated device to transition from the disengaged configuration to the engaged configuration prior to lapse of the predetermined equilibration time.

16. The HVAC unit of claim 11, wherein the controller is further configured to reactivate the first signal to reactivate the compressor and operate the first variable speed fan based on a threshold operating speed after the predetermined equilibration time has lapsed.

17. The HVAC unit of claim 11, wherein the pressure activated device comprises a switch that is configured to disconnect communication between the controller and the compressor in the disengaged configuration.

18. The HVAC unit of claim 1, comprising:
a power source configured to provide the first signal to the controller; and
a component of the compressor configured to receive the first signal from the pressure activated device, wherein the power source, the controller, the pressure activated device, and the component are communicatively coupled to one another in series.

* * * * *